United States Patent [19]

Bohle

[11] Patent Number: 4,614,134
[45] Date of Patent: Sep. 30, 1986

[54] OVERLOAD PROTECTION SYSTEM FOR PLANETARY GEAR DRIVE

[75] Inventor: Werner Bohle, Lüdinghausen, Fed. Rep. of Germany

[73] Assignee: Gewerkschaft Eisenhutte Westfalia, Lunen, Fed. Rep. of Germany

[21] Appl. No.: 622,544

[22] Filed: Jun. 20, 1984

[30] Foreign Application Priority Data

Jun. 28, 1983 [DE] Fed. Rep. of Germany ....... 3323251

[51] Int. Cl.⁴ ............................................. F16H 57/10
[52] U.S. Cl. ....................................... 74/768; 74/786; 74/801; 173/12
[58] Field of Search ................. 74/768, 797, 801, 786; 173/12; 192/91 A

[56] References Cited

U.S. PATENT DOCUMENTS

| | | | |
|---|---|---|---|
| 2,913,061 | 11/1959 | Beyerstedt et al. | 74/786 X |
| 3,096,838 | 7/1963 | Treier | 74/768 X |
| 3,318,390 | 5/1967 | Hoza et al. | 173/12 |
| 3,563,113 | 2/1971 | Harvey | 74/786 |
| 3,687,253 | 8/1972 | Bjorklund | 192/91 A |
| 3,834,467 | 9/1974 | Fuchs | 173/12 |
| 3,877,321 | 4/1975 | Storer, Jr. | 74/768 |
| 3,958,465 | 5/1976 | Hiersig et al. | 74/801 |
| 4,104,780 | 8/1978 | Sigmund | 173/12 X |
| 4,114,477 | 9/1978 | Iverson | 74/768 |
| 4,147,219 | 4/1979 | Wallace | 173/12 |
| 4,183,265 | 1/1980 | Pauley | 74/786 |
| 4,192,409 | 3/1980 | Ueda | 74/768 X |
| 4,375,123 | 3/1983 | Wey | 173/12 X |
| 4,406,340 | 9/1983 | Gennaux | 74/801 X |
| 4,418,765 | 12/1983 | Mori et al. | 173/12 |
| 4,468,985 | 9/1984 | Nilsson | 74/801 |
| 4,483,430 | 11/1984 | Carmichael et al. | 192/91 A |

FOREIGN PATENT DOCUMENTS 2088442 6/1982 United Kingdom .

Primary Examiner—Kenneth J. Dorner
Assistant Examiner—Dwight G. Diehl
Attorney, Agent, or Firm—Thompson, Birch, Gauthier & Samuels

[57] ABSTRACT

A gearing unit with planetary gearing stages employs a load sensor and a clutch for disengaging drive through the gearing should the sensor detect overloading. The load sensor is in the form of a stationary pin provided with a strain gauge transducer easily accessible via a bore in a housing. The pin bears on a rotatable component of one of the planetary gearing stages to hold this component stationary during operation and is subjected to force proportional to dynamic loading on the gearing. The clutch serves as a brake to hold a rotatable component of another planetary gearing stage stationary and on release permits this component to rotate to interrupt the drive.

12 Claims, 4 Drawing Figures

4,614,134

OVERLOAD PROTECTION SYSTEM FOR PLANETARY GEAR DRIVE

FIELD OF THE INVENTION

The present invention relates to drive or gearing units for use with mining apparatus, such as coal ploughs and scraper-chain conveyors, and more particularly to overload protection of such units and apparatus.

BACKGROUND TO THE INVENTION

It is known to incorporate a load sensor on the output shaft of a drive unit and to use this sensor to operate a clutch to disconnect the output shaft from the input shaft in the event of an overload. German patent specification 3043237 (which has an equivalent GB 2088442) describes a drive or gearing unit of this type. U.S. patent application Ser. No. 563 487, filed Dec. 20, 1983 and assigned to the same assignee as the present application, describes a modified protection system in which the response time is minimized.

In known systems, strain gauge transducers are normally mounted directly on rotating shafts and this presents considerable difficulties in the transmission of the electrical signals. Moreover, the operation of removing and replacing the transducers is laborious and time consuming.

A general object of the present invention is to provide an improved gearing unit with overload sensing and protection.

SUMMARY OF THE INVENTION

A drive unit according to the invention incorporates at least two planetary gearing stages, load sensing means for sensing the load transmitted by the gearing being associated with one of the stages and a selectibly operable coupling means being associated with another of the stages to permit or interrupt drive in the event of overloading. Preferably the unit employs means holding a rotatable component of a first planetary gearing stage stationary during use which means includes or embodies a load sensor. The coupling means may act to hold a rotatable component of a second planetary gearing stage stationary to permit drive between the shafts.

In a preferred construction, used particularly for high performance coal ploughs and conveyors, the first planetary gearing stage forms an output stage of a gear train of the unit. The load sensor may be a strain gauge transducer incorporated on a removable pin which is easily and conveniently replaced without extensive dismantling of the unit. The load or torque transmitted by the planetary gearing can be assessed very accurately. Further in accordance with the invention, the output from the load sensor can be used to operate the coupling means which may be a clutch, for example, to disconnect the output shaft of the unit from the input shaft in the event of overload. Conveniently, the coupling means is a clutch-brake device mounted in a protected position either coaxial with the input shaft or alongside this shaft.

The component of the first and second planetary gearing stages which is held stationary by the holding means and the coupling means is preferably an internally toothed ring meshing with the planetary gears, although it is possible to hold the planetary gear carrier stationary. The rotatable component of the first stage may be rotatable in either direction and a preferred arrangement has a pair of simple pins carrying strain gauge transducers engaging directly or indirectly on diametrically opposed stop faces on the component or toothed ring which is to be held stationary. The pins can react against the main casing again either directly or indirectly. The stop faces can bear on the gauge pins through the provision of, for example, further intermediate pins. In this arrangement the direction of rotation of the drive is thus reversible.

The electrical signal from the or each transducer provided in the gearing unit in accordance with the invention can be used in a variety of ways to interrupt the drive or reduce the load. Preference is given however to the operation of the coupling means as described previously with the aid of an electro-magnetic valve which permits hydraulic fluid to release clutch plates. An arrangement as described in the aforementioned U.S. patent application Ser. No. 563 487, herein incorporated by reference, can be utilised to optimize the response time.

The pressure fluid for releasing the rotatable component of the second planetary gearing stage can be passed through channels or bores within a stationary part such as a fixed clutch-plate carrier of the clutch-brake device.

A gearing unit constructed in accordance with the invention can be especially compact with the input and output shafts coaxial. The toothed ring member of the second gearing stage may have a hub portion surrounding the coupling means. This hub portion may then carry clutch plates engageable with clutch plates supported by a carrier fixed to a casing of the unit. In another construction the ring member which meshes with internal teeth with the planet wheels of the second planetary gearing stage also has external teeth which mesh directly or indirectly with the teeth of a rotatable clutch plate carrier. This carrier can then surround a complementary clutch plate carrier fixed to the casing.

The invention may be understood more readily, and various other aspects and features of the invention may become apparent, from consideration of the following description.

BRIEF DESCRIPTION OF DRAWINGS

Embodiments of the invention will now be described, by way of examples, with reference to the accompanying drawings, wherein.

DESCRIPTION OF PREFERRED EMBODIMENTS

Figure 1:
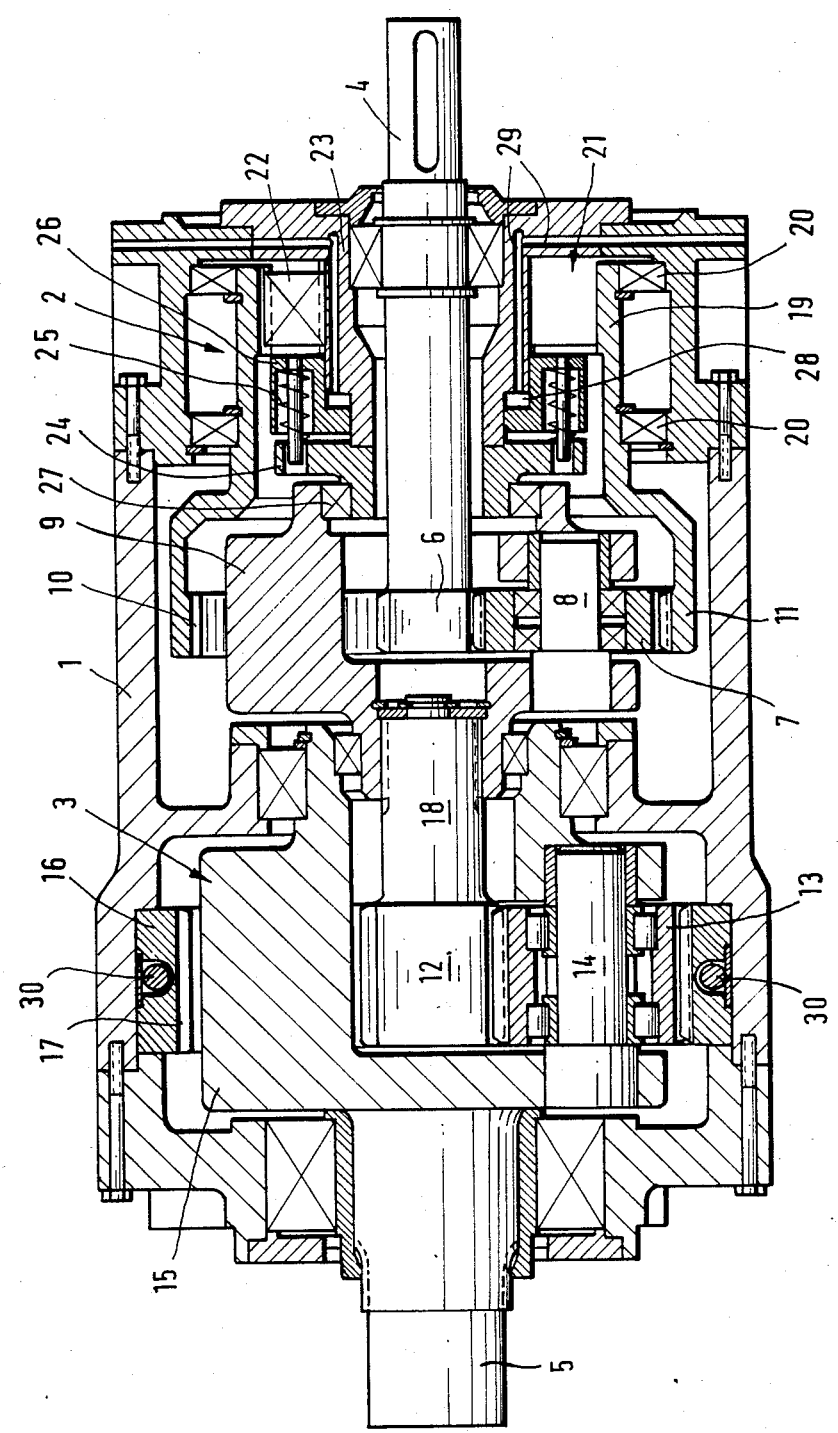
FIG. 1 is a schematic sectional side view of a gearing unit constructed in accordance with the invention.

The units depicted in the accompanying drawings are intended primarily for driving chains of underground mining machinery, particularly coal ploughs and scraperchain conveyors. A drive or gearing unit as shown in FIG. 1 is composed of a gear train mounted within a casing 1. The gear train takes the form of two planetary gearing stages 2, 3 which interconnect an input shaft 4 to an output shaft 5. The input shaft 4 would be driven by a motor or the like (not shown) while the shaft 5 may have a chain wheel (not shown) around which a chain driven by the shaft is entrained. The planetary gearing stage 2 forms an input stage of the gearing and is composed of a sun wheel 6 mounted for rotation with the input shaft 4 and meshing with three planetary gears 7 each mounted on a rotatable shaft supported on a common carrier 9. The planet wheels 7 also mesh with internal teeth 10 of a ring 11 coaxial with the shaft 4. The planetary gear stage 3 associated with the output shaft 5 forms an output stage of the gearing and is again composed of a sun wheel 12, meshing with planet wheels 13 rotatably mounted on shafts 14 supported on a common carrier 15. A toothed ring 16 mounted for rotation in the casing 1 is coaxial with the sun wheel 12 and has internal teeth 17 which mesh with the planet wheels 13. The sun wheel 12 is mounted on a shaft 18 which is rotatably locked to the carrier 9 of the planetary gearing stage 2. The ring 11 of the planetary gearing stage 2 has an axial hub portion 19 supported by bearings 20 in the casing 1. Within this hub portion 19 there is disposed coupling means in the form of a clutch-brake device 21 which surrounds the input shaft 4. The device 21 is composed of a stack of discs or plates alternately mounted to the hub portion 19 and to a complementary carrier 23 locked to the casing 1. The clutch plates can be keyed to the respective carriers 19, 23 for rotation therewith and axial displacement. The clutch plates are held in face-to-face contact with the aid of a spring device 25 in the form of a stack of plate springs. The spring device 25 is supported by a ring 24 conveniently fixed to the carrier 23 and a thrust or pressure ring 26 is disposed between the spring device 25 and the clutch plates. The spring device 25 thus locks the carriers 19, 23 together by the action of the clutch plates. The planet wheel carrier 9 is rotatably supported with the aid of a bearing 27 on the ring 24.

The provision of the clutch-brake device 21 within the hub portion 19 of the ring 17 thus serves as a selective coupling device or drum which holds the ring 11 stationary. With the clutch plates released however, the ring 11 is permitted to rotate to interrupt the drive connection between the shafts 4, 5. The clutch plates are released with the aid of hydraulic pressure fluid which passes into a pressure chamber 28 to displace the ring 26 in opposition to the spring device 25. Channels or bores 29 in the carrier 23 permit pressure fluid to flow to and from the chamber 28.

Figure 3:
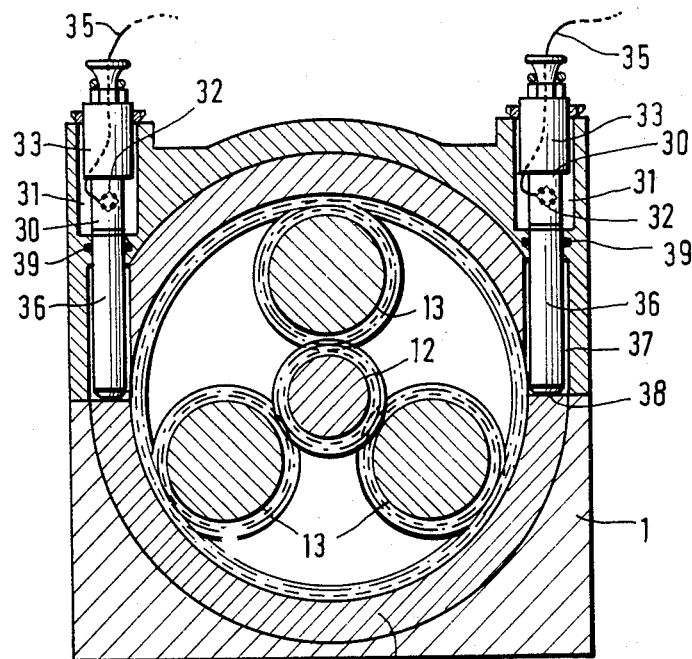
FIG. 3 is a cross section of the gearing unit shown in FIGS. 1 and 2.
Figure 4:
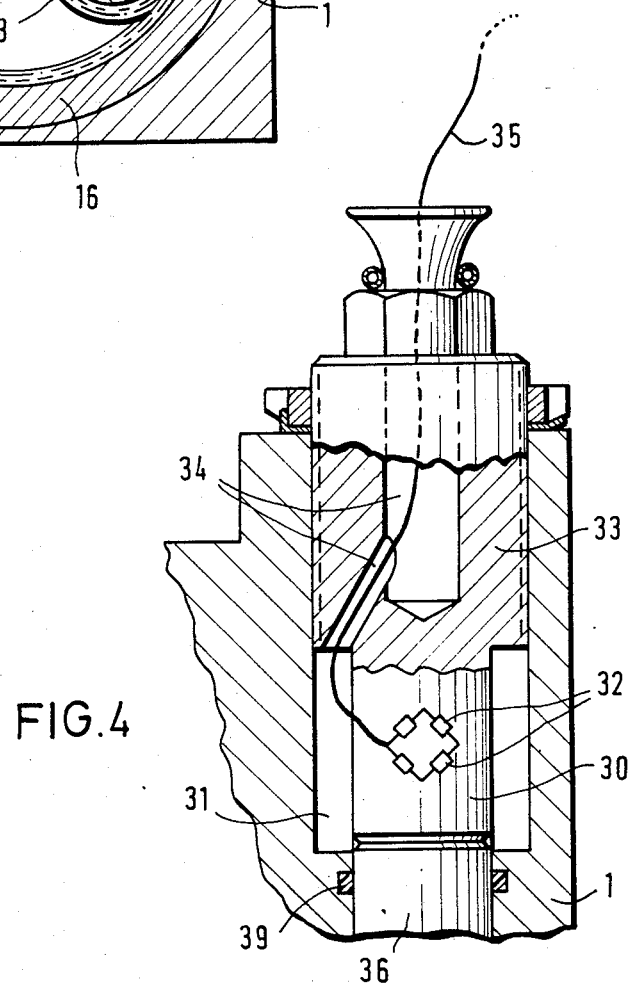
FIG. 4 depicts part of the gearing unit of FIGS. 1 and 2 on a somewhat larger scale.

The other planetary gearing stage 3 is provided with load measuring sensors which take the form of pins 30 which lock the ring 16 against rotation in both directions. As may be seen particularly in FIGS. 3 and 4, the load measuring sensors are located on diametrically opposite sides of the ring 16 in respective chambers 31 in the housing 1. The pins 30 each have an internal reduced portion carrying a transducer in the form of a bridge of strain gauges 32 disposed diagonally in relation to the axis of the pin. The external portion of each pin 30 is of somewhat larger diameter than the internal portion and has a screw threading which forms a plug 33 which can be screwed into a internal thread within the respective chamber 31. These plugs thereby close off the chambers 31. The pins 30 also have channels or ducts in the form of bores 34 through which electrical cables 35 leading to the transducers 32 are led. Intermediate pins 36 are disposed between the pins 30 in chambers 37 located tangentially in relation to the ring 16 and formed partly by an shaped inner wall of the housing 1 and partly in the periphery of the ring 16. The ring 16 is provided on diametrically opposite sides with radial stop faces 38 which engage directly on the intermediate pins 36. These pins 36 are sealed with packings 39 so that no oil can escape from the interior of the casing 1 when the sensors are being removed and replaced.

During operation, and with the clutch 21 closed, the ring 11 is held stationary and drive is transmitted via the sun wheel 6, the planet wheel 7 and the carrier 9 to the shaft 18 and thence from the sun wheel 12 the planet wheels 13 and the carrier 15 to the shaft 5. The ring 16 exerts force on one of the load measuring sensors 30 which varies according to the loading on the gearing and consequently the electrical signal from the sensors 30 is indicative of the torque provided at the output shaft 5. An electronic control device assesses the relevant signal and if the signal signify an overload, the device operates an electro-magnetic valve which permits pressure fluid to enter the pressure chamber 28. This in turn releases the clutch 21 to permit the ring 11 to rotate freely and thus interrupt the drive.

Figure 2:
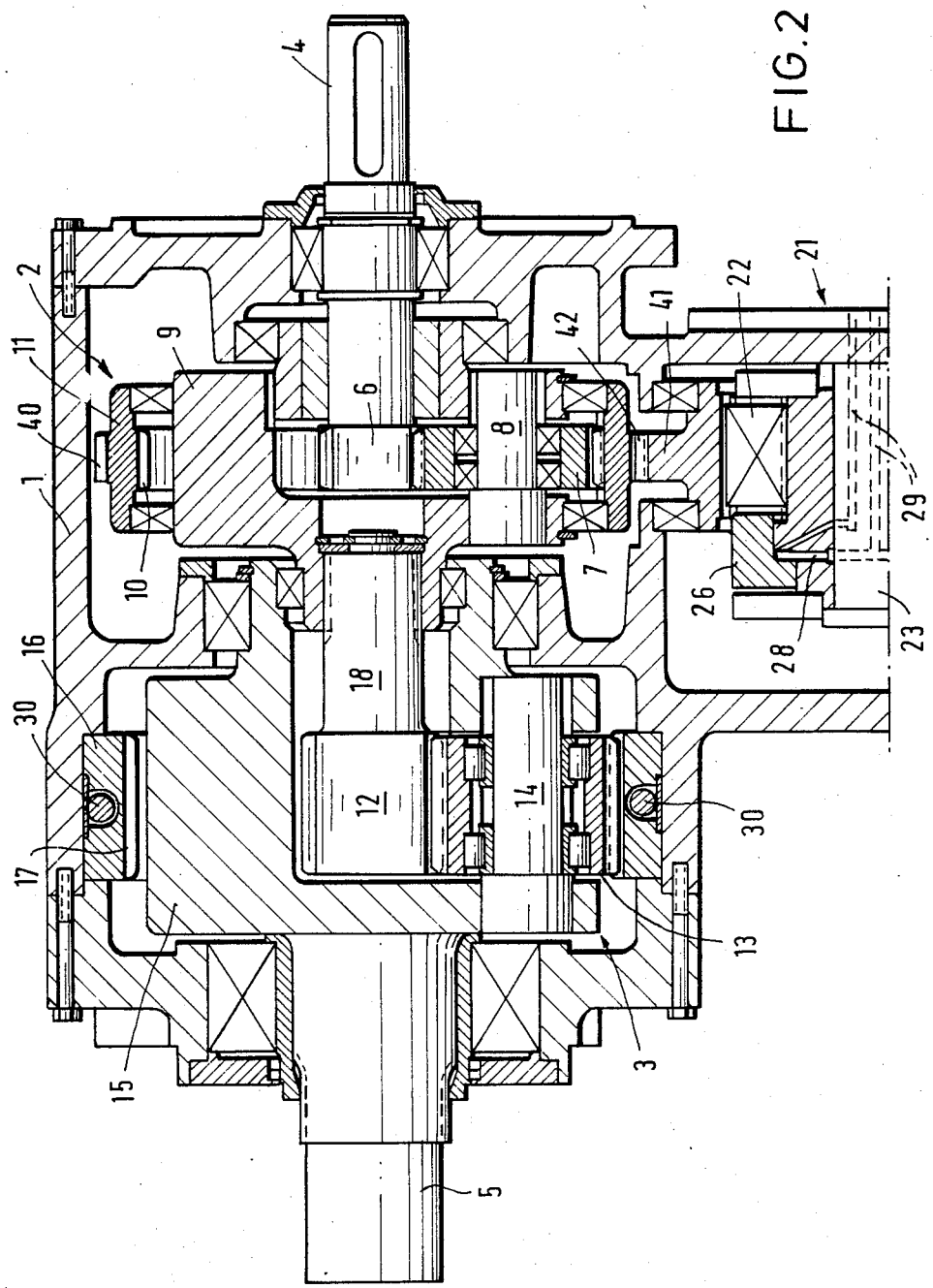
FIG. 2 is a schematic sectional side view of a further gearing unit constructed in accordance with the invention.

In the construction depicted in FIG. 2, like reference numerals are used to those in the other Figures and the main difference between the unit shown in FIGS. 1 and 2 is that in FIG. 2, the clutch 21 is not coaxial with the shafts 4 and 5 but disposed alongside the planetary gearing stage 2. In this modified arrangement the ring 11 has an external system of teeth which meshes with teeth 42 provided on a rotatable carrier 41 of the clutch. This carrier has alternate clutch plates mounted thereon for rotation and axial displacement. The other carrier again designated 23 and securing to the casing 1 is generally surrounded by the carrier 41. During operation when the clutch 21 is closed, the ring 11 is again secured against rotation by the locked carrier 41.

I claim:

1. A gearing unit for use with a mining apparatus, said gearing unit comprising: a housing; an input shaft extending into the housing for imparting rotary drive; an output shaft extending into the housing; first and second planetary gearing stages disposed within the housing for drivably interconnecting the input shaft to the output shaft, each gearing stage comprising a sun wheel, planet wheels meshing with the sun wheel, a carrier supporting the planet wheels, and an outer ring gear meshing with the planet wheels, the carrier and the ring gear of the first gearing stage constituting rotatable components one of which is drivably connected to the sun wheel of the second gearing stage, the sun wheel of said first gearing stage being drivably connected to the input shaft and the carrier of the second stage being drivably connected to the output shaft; load sensors in the form of pins engaging with the outer ring gear of said second gearing stage to hold the ring gear stationary and provide electrical signals indicative of loading in alternate directions of rotary drive; releasable coupling means for coupling the other rotatable component of the first gearing stage to the housing to hold said other rotatable component stationary and to permit rotary drive to be transmitted through both the gearing stages from the input shaft to the output shaft; and a pressure chamber coacting with the coupling means for receiving hydraulic pressure fluid used to effect release of the coupling means to permit the associated other rotatable component to rotate, thereby to interrupt the drive through the gearing stages in response to said electrical signals in the event of overloading.

2. A gearing unit according to claim 1, wherein the coupling means is a clutch.

3. A gearing unit according to claim 1, wherein the pins carry strain gauge transducers.

4. A gearing unit according to claim 3, wherein each pin has at least one bore therein for accomodating an electrical cable leading to the transducer.

5. A gearing unit according to claim 1, wherein the sensors are located within chambers formed in the housing of the gearing unit for easy removal and replacement.

6. A gearing unit according to claim 1, wherein each load sensor extends generally tangentially in relation to said ring gear of the second gearing stage and said ring gear has radial stop faces which engage means transmitting force to the load sensors.

7. A gearing unit according to claim 1, wherein intermediate pins engage on stop faces of the ring gear of the second planetary gearing stage and transmit thrust force to the load sensors.

8. A gearing unit according to claim 1, wherein the ring gear of the first planetary gearing stage has a hub portion containing the coupling means.

9. A gearing unit according to claim 1, wherein the coupling means is a clutch-brake device and the ring gear of the first gearing stage has external teeth in drivable engagement with a toothed rotatable clutch plate carrier of the clutch-brake device which surrounds another clutch plate carrier fixed to the housing of the gearing.

10. A gearing unit according to claim 1, wherein the coupling means is subjected to biasing force to hold the ring gear of the first gearing stage stationary by a spring device and the pressure chamber when receiving pressure fluid opposes the action of the spring device to release the coupling means.

11. A gearing unit according to claim 1, wherein the coupling means is coaxial with the input shaft.

12. A gearing unit according to claim 1, wherein the coupling means is disposed laterally of the input shaft.

* * * * *